(12) United States Patent
Jung et al.

(10) Patent No.: US 11,175,149 B2
(45) Date of Patent: Nov. 16, 2021

(54) VEHICLE LOCALIZATION METHOD AND APPARATUS

(71) Applicant: Samsung Electronics Co., Ltd., Suwon-si (KR)

(72) Inventors: Kyungboo Jung, Seoul (KR); Nahyup Kang, Seoul (KR); Chul Woo Kang, Suwon-si (KR); Wonhee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 16/284,056

(22) Filed: Feb. 25, 2019

(65) Prior Publication Data

US 2020/0116499 A1 Apr. 16, 2020

(30) Foreign Application Priority Data

Oct. 16, 2018 (KR) .................. 10-2018-0123340

(51) Int. Cl.
*G01C 21/32* (2006.01)
*G06T 7/70* (2017.01)
(Continued)

(52) U.S. Cl.
CPC ......... *G01C 21/32* (2013.01); *G06K 9/00798* (2013.01); *G06T 7/70* (2017.01);
(Continued)

(58) Field of Classification Search
CPC ...... G08G 1/167; G06K 9/00798; G06T 7/70; G06T 2207/30244; G06T 2207/30256; G01C 21/32; G01C 21/3658
(Continued)

(56) References Cited

U.S. PATENT DOCUMENTS 9,008,369 B2 * 4/2015 Schofield ............... G08G 1/166
382/104
9,081,385 B1 * 7/2015 Ferguson ............. G05D 1/0246
(Continued)

FOREIGN PATENT DOCUMENTS

AU 2017100399 A4 * 5/2017 ....... G08G 1/096844
CN 105260699 A * 1/2016 ......... G06K 9/00798
(Continued)

OTHER PUBLICATIONS

Weon, et al., Precise localization of a vehicle within a driving lane by combining the vehicle trajectory with vision information, 2016 16th International Conference on Control, Automation and Systems, pp. 1010-1015 (Year: 2016).*

(Continued)

*Primary Examiner* — Atul Trivedi
(74) *Attorney, Agent, or Firm* — NSIP Law

(57) ABSTRACT

A vehicle localization method and a vehicle localization apparatus are disclosed. The vehicle localization method includes estimating an initial position of a vehicle based on data sensed by a position sensor, determining a driving lane of the vehicle based on a front-view image captured from the vehicle, correcting the initial position of the vehicle based on the driving lane, and determining a position of the vehicle in the driving lane based on geometry information of a lane boundary in the front-view image.

24 Claims, 13 Drawing Sheets

(51) Int. Cl.
*G06K 9/00* (2006.01)
*G08G 1/16* (2006.01)

(52) U.S. Cl.
CPC .... *G08G 1/167* (2013.01); *G06T 2207/30244* (2013.01); *G06T 2207/30256* (2013.01)

(58) Field of Classification Search
USPC .......................................................... 701/446
See application file for complete search history.

(56) References Cited

U.S. PATENT DOCUMENTS

| | | | |
|---|---|---|---|
| 9,483,700 | B1 | 11/2016 | Chen et al. |
| 9,558,556 | B2 * | 1/2017 | Fukata .................... G08G 1/165 |
| 10,867,190 | B1 * | 12/2020 | Vajna ....................... G06T 7/593 |
| 2011/0196608 | A1 | 8/2011 | Jansen et al. |
| 2016/0335507 | A1 | 11/2016 | Chen et al. |
| 2017/0004711 | A1 | 1/2017 | Pandita et al. |
| 2017/0267177 | A1 * | 9/2017 | Nariyambut Murali ...................... G06K 9/4628 |
| 2017/0316684 | A1 * | 11/2017 | Jammoussi ...... G08G 1/096775 |
| 2017/0369057 | A1 * | 12/2017 | Gurghian .............. B60W 30/12 |
| 2018/0024562 | A1 * | 1/2018 | Bellaiche ................. G06T 7/73 701/26 |
| 2018/0045519 | A1 | 2/2018 | Ghadiok et al. |
| 2018/0053060 | A1 | 2/2018 | Huang et al. |
| 2018/0129887 | A1 | 5/2018 | Kang et al. |
| 2018/0189578 | A1 * | 7/2018 | Yang .................. G06K 9/00798 |
| 2018/0197021 | A1 | 7/2018 | Lee |
| 2018/0282955 | A1 * | 10/2018 | McClendon ....... G08G 1/09623 |
| 2019/0130182 | A1 * | 5/2019 | Zang .................. G06K 9/00651 |
| 2019/0180115 | A1 * | 6/2019 | Zou ....................... G06N 3/0454 |
| 2019/0266418 | A1 * | 8/2019 | Xu ........................ G06K 9/4604 |
| 2019/0279004 | A1 * | 9/2019 | Kwon .................... G06N 5/046 |
| 2019/0295420 | A1 * | 9/2019 | Fu .......................... G01C 21/30 |
| 2019/0347821 | A1 * | 11/2019 | Stein .................... G05D 1/0246 |
| 2019/0384304 | A1 * | 12/2019 | Towal .................. G05D 1/0221 |
| 2020/0026282 | A1 * | 1/2020 | Choe .................... G05D 1/0088 |
| 2020/0218907 | A1 * | 7/2020 | Baik ....................... B60R 11/04 |
| 2020/0218909 | A1 * | 7/2020 | Myeong ............. G06K 9/00798 |
| 2020/0219399 | A1 * | 7/2020 | Pfeifle .................. G06N 3/0454 |
| 2020/0265245 | A1 * | 8/2020 | Guo ......................... G06K 9/44 |
| 2020/0309541 | A1 * | 10/2020 | Lavy .................... G06K 9/6256 |
| 2020/0324795 | A1 * | 10/2020 | Bojarski ......... B60W 60/00274 |
| 2020/0385014 | A1 * | 12/2020 | Hanniel .............. B60W 60/001 |
| 2020/0393261 | A1 * | 12/2020 | Zhang .................. G08G 1/0133 |
| 2021/0046930 | A1 * | 2/2021 | Wang ................... B60W 40/13 |

FOREIGN PATENT DOCUMENTS

| | | | | |
|---|---|---|---|---|
| CN | 107092862 | A | * | 8/2017 |
| CN | 107798724 | A | * | 3/2018 .......... G05D 1/0088 |
| CN | 109389095 | A | * | 2/2019 |
| CN | 109543493 | A | * | 3/2019 |
| CN | 109977908 | A | * | 7/2019 |
| CN | 110203210 | A | * | 9/2019 |
| CN | 111667706 | A | * | 9/2020 |
| EP | 3 321 842 | A1 | | 5/2018 |
| JP | 2006260358 | A | * | 9/2006 ......... G06K 9/00798 |
| JP | 4392389 | B2 | | 12/2009 |
| JP | 2010-19759 | A | | 1/2010 |
| JP | 2015-212944 | A | | 11/2015 |
| JP | 2021025909 | A | * | 2/2021 |
| KR | 10-2015-0087619 | A | | 7/2015 |
| KR | 10-2015-0112536 | A | | 10/2015 |
| KR | 10-2017-0082374 | A | | 7/2017 |
| KR | 10-2018-0009280 | A | | 1/2018 |
| KR | 10-1882683 | B1 | | 7/2018 |

OTHER PUBLICATIONS

Kang, et al., Lane-Level Map-Matching Method for Vehicle Localization Using GPS and Camera on a High-Definition Map, MDPI, (Year: 2020).*
Extended European Search Report dated Oct. 18, 2019 in counterpart European Patent Application No. 19169294.6 (6 pages in English).

* cited by examiner

VEHICLE LOCALIZATION METHOD AND APPARATUS

CROSS-REFERENCE TO RELATED APPLICATIONS

This application claims the benefit under 35 USC § 119(a) of Korean Patent Application No. 10-2018-0123340 filed on Oct. 16, 2018 in the Korean Intellectual Property Office, the entire disclosure of which is incorporated herein by reference for all purposes.

BACKGROUND

1. Field

The following description relates to vehicle localization technology.

2. Description of Related Art

To assist driving of a vehicle and other modes of transportations, a navigation system provides a driver with various visual information through augmented reality (AR). Such a navigation system receives global positioning system (GPS) signals from a satellite via a GPS sensor and estimates a current position of the vehicle based on the received GPS signal. A value of an absolute position based on a latitude and a longitude of the vehicle may be derived from the GPS signals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a vehicle localization method including estimating an initial position of a vehicle based on data sensed by a position sensor, determining a driving lane of the vehicle based on a front-view image captured from the vehicle, correcting the initial position of the vehicle based on the driving lane, and determining a position of the vehicle in the driving lane based on geometry information of a lane boundary in the front-view image.

The determining of the position of the vehicle may include acquiring an inverse perspective mapping image of the front-view image, extracting lane boundaries of the driving lane in the inverse perspective mapping image, and determining the position of the vehicle in the driving lane based on geometry information of the extracted lane boundaries.

The acquiring of the inverse perspective mapping image may include selecting a region of interest (ROI) may include a road area in the front-view image, and removing a perspective distortion from the ROI resulting from a camera angle to the ROI.

The extracting of the lane boundaries of the driving lane may include extracting regions having a shape of a line and a color of the lane boundary that are located closest to a center line of the inverse perspective mapping image.

The determining of the position of the vehicle may include determining a position of the vehicle based on a difference between a first lower intermediate position value between lines of the extracted lane boundaries and a second lower intermediate position value of the inverse perspective mapping image.

The vehicle localization method may include determining a direction in which the vehicle is headed at the determined position based on the geometry information of the lane boundary in the front-view image.

The determining of the direction in which the vehicle is headed may include acquiring an inverse perspective mapping image of the front-view image, extracting a lane boundary of the driving lane from the inverse perspective mapping image, and determining the direction in which the vehicle is headed based on geometry information of the extracted lane boundary.

The determining of the direction in which the vehicle is headed may include determining the direction in which the vehicle is headed based on a direction of a line corresponding to the extracted lane boundary.

The correcting of the initial position of the vehicle may include determining a position on a map corresponding to an intermediate position of the driving lane to be the position of the vehicle.

The determining of the driving lane of the vehicle may include determining a lane number of the driving lane of the vehicle from the front-view image using a neural network-based driving lane identification model.

The determining of the driving lane of the vehicle may include determining a lane number of the driving lane of the vehicle from the front-view image and a surrounding image of the vehicle using a neural network-based driving lane identification model.

The determining of the driving lane of the vehicle may include determining a first lane number in a direction from left toward right and a second lane number in a direction from right toward left using the neural network-based driving lane identification model, and determining the driving lane of the vehicle based on a lane number of one of the first lane number or the second lane number having a higher reliability.

The correcting of the initial position of the vehicle may include correcting the initial position of the vehicle to a position on a map corresponding to the determined lane number.

The correcting of the initial position of the vehicle may include determining whether the initial position of the vehicle is corrected to a position of the driving lane based on a driving direction of the vehicle and a driving lane of the vehicle determined at a previous time.

In another general aspect, there is provided a vehicle localization apparatus including a position sensor configured to sense position data of a vehicle, and a processor configured to estimate an initial position of the vehicle based on the position data, determine a driving lane of the vehicle based on the front-view image captured from the vehicle, correct the initial position of the vehicle based on the driving lane, and determine a position of the vehicle in the driving lane based on geometry information of a lane boundary in the front-view image.

The processor may be configured to correct the initial position of the vehicle by determining a position on a map corresponding to an intermediate position of the current driving lane to be the position of the vehicle.

The processor may be configured to convert the front-view image into an inverse perspective mapping image, extract lane boundaries of the driving lane in the inverse perspective mapping image, and determine the position of the vehicle in the driving lane based on geometry information of the extracted lane boundaries.

The processor may be configured to determine a position of the vehicle based on a difference between a first lower intermediate position value between lines of the extracted lane boundaries and a second lower intermediate position value of the inverse perspective mapping image The processor may be configured to determine a direction in which the vehicle is headed based on the geometric information of the lane boundary.

In another general aspect, there is provided a vehicle localization apparatus including a position sensor configured to sense position data of a vehicle, and a processor configured to, determine a lane number of a driving lane in which the vehicle is driving based on a front-view image captured from the vehicle, correct the position data of the vehicle based on map information and the lane number, and determine a position of the vehicle based on the corrected position data.

The processor may be configured to correct the position data of the vehicle by identifying a lane corresponding to the lane number on a map and determining a position on the map corresponding to an intermediate position of the driving lane to be a position of the vehicle.

The processor may be configured to convert the front-view image into an inverse perspective mapping image, extract lane boundaries of the driving lane from the inverse perspective mapping image, and adjust the position of the vehicle by determining a position of the vehicle in the driving lane based on geometry information of the extracted lane boundaries.

The processor may be configured to estimate an initial position of the vehicle based on the position of the vehicle, determine a driving lane of the vehicle based on a front-view image of the vehicle, adjust the initial position of the vehicle in a lateral direction based on the driving lane, detect boundaries of the driving lane in an inverse perspective mapping image of the front-view image, determine a direction of the vehicle and a distance of the adjusted position of the vehicle from an intermediate position of the boundaries of the driving lane, and correct the adjusted position based on the distance and the direction.

The processor may be configured to estimate the initial position based on correcting the position of the vehicle using a distance between the vehicle and an object around the vehicle.

The processor may be configured to determine the driving lane of the vehicle based on identifying, on a map, a lane that is closest to the initial position of the vehicle.

Other features and aspects will be apparent from the following detailed description, the drawings, and the claims.

Figure 1:
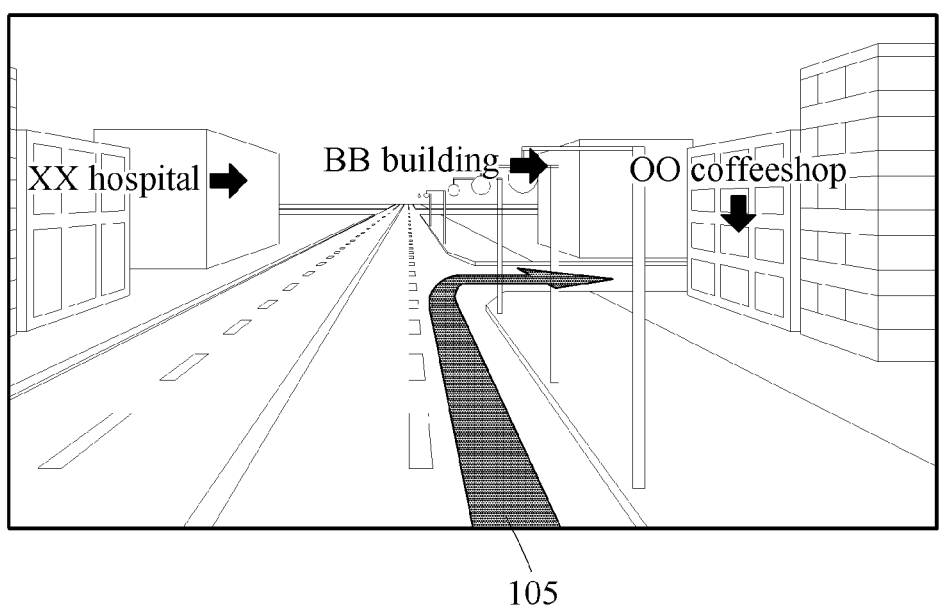
FIG. 1 illustrates an example of a route guide display provided by an augmented reality (AR) navigation device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility device, or a drone. In an example, the smart mobility device includes mobility devices such as, for example, electric wheels, an electric kickboard, and an electric bike. In an example, vehicles include motorized and non-motorized vehicles, for example, a vehicle with a power engine (for example, a cultivator or a motorcycle), a bicycle or a handcart. The term "road" is a thoroughfare, route, or connection, between two places that has been improved to allow travel by foot or some form of conveyance, such as a vehicle. A road can include various types of roads such as, for example, a highway, a national road, a local road, an expressway, farm roads, local roads, high-speed national roads, and a motorway. The term "lane" refers to a road space distinguished by lane boundaries marked on a surface of the road. The term "current driving lane" refers to a lane in which the vehicle is currently driving and indicates a lane space currently occupied and used by the vehicle. The current driving lane is also referred to as an "ego lane". The term "lane boundary" refers to a solid line or a broken line marked on the surface of the road to distinguish the lane. In this disclosure, the term "lane boundary" is interchangeably used with the term "lane marking".

The methods and apparatuses described herein determine a position of a vehicle with increased accuracy. The methods and apparatuses are used to determine a position of a vehicle in a navigation device, such as, for example, an augmented reality head-up display (AR 3D HUD), and an autonomous vehicle. In an example, the methods and apparatuses described herein may be used to generate information to support a driver or to control an autonomous vehicle. In an example, the examples described herein may also be used to interpret visual information for an intelligent system installed for fully autonomous driving or driving assistance in a vehicle, and used to assist safe and comfortable driving. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling, a smartphone, or a mobile device. The examples related to displaying a driving guidance for vehicles is provided as an example only, and other examples such as, for example, training, gaming, applications in healthcare, public safety, tourism, and marketing are considered to be well within the scope of the present disclosure.

In addition to the vehicle described herein, methods and apparatuses described herein may be included in various other devices, such as, for example, a walking assistance device, a wearable device, a security device, a robot, a mobile terminal, and various Internet of Things (IoT) devices.

Hereinafter, the examples will be described in detail with reference to the accompanying drawings, wherein like drawing reference numerals are used for like elements.

FIG. 1 is a diagram illustrating an example of a route guide display provided by an augmented reality (AR) navigation device.

Referring to FIG. 1, in an example an AR navigation device sets a route from a position of a vehicle to a destination based on the position of the vehicle and map information and provides the set route to a driver of the vehicle using an AR object 105. In this example, the AR navigation device uses a global positioning system (GPS) sensor to measure an absolute position, for example, a latitude and a longitude of the vehicle. Because a position measurement value of the GPS sensor has an error range of about 10 meters (m), it is difficult to identify a position of the vehicle in the current driving lane from among the lanes, when each of the lanes have a width of about 3 m using the GPS sensor. To reduce the error range of the GPS sensor, an inertial measurement unit (IMU) and/or a visual odometry (VO) may be used, but that may be insufficient to accurately identify a position of the vehicle.

If the AR object 105 is displayed in lane units, it is possible to provide a driver of the vehicle with more precise and realistic route guide. In order to set a more precise route guide, a position of the vehicle may be accurately measured in advance. Also, if a direction in which the vehicle is headed is estimated, it is possible to more precisely determine the route guide.

The methods and apparatuses described herein identify a driving lane in which a vehicle is currently driving based on an ambient image of the vehicle and determine a position and a direction of the vehicle in the driving lane with increased accuracy. The methods and apparatuses described herein estimate an accurate position of the vehicle in the driving lane using the driving lane of the vehicle and lane boundary information of the driving lane. Thus, accurately predicting an absolute position of the vehicle and matching the absolute position and high-density map information to estimate a position of the position at an error range level of several centimeters (cm).

Figure 2:
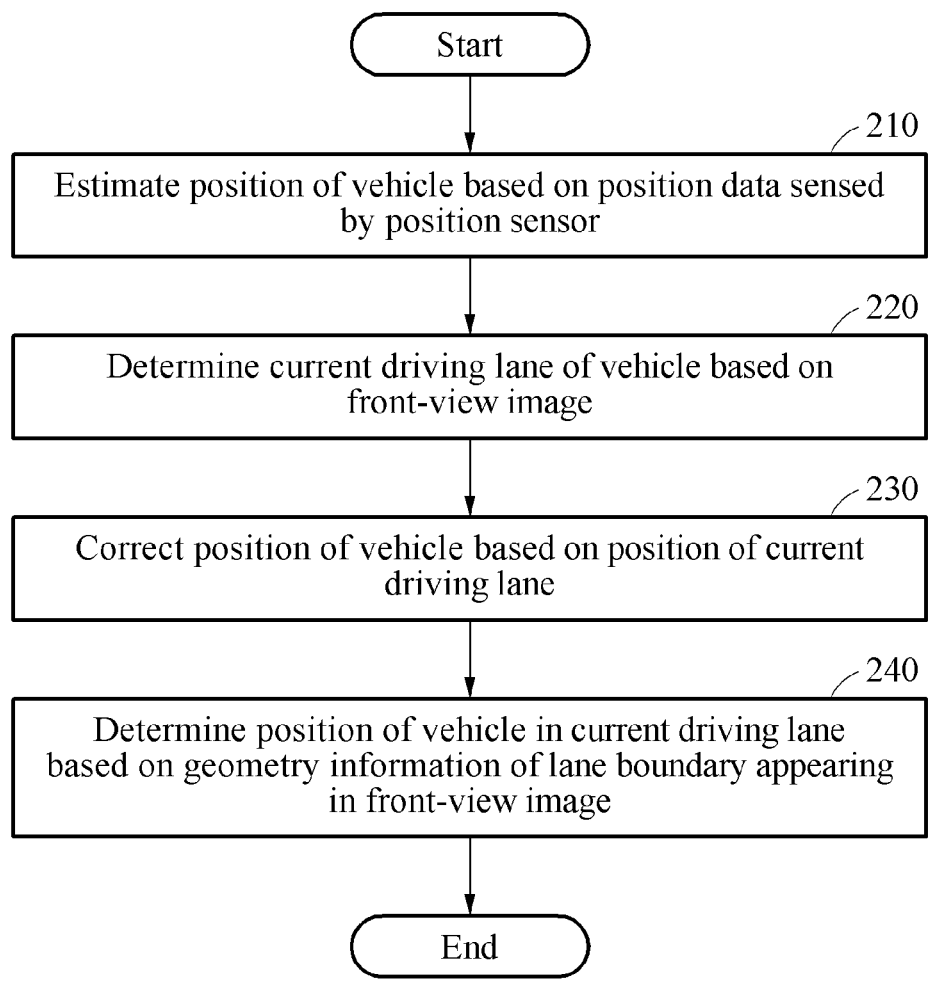
FIGS. 2 and 3 illustrate examples of operations of a vehicle localization method.
Figure 3:
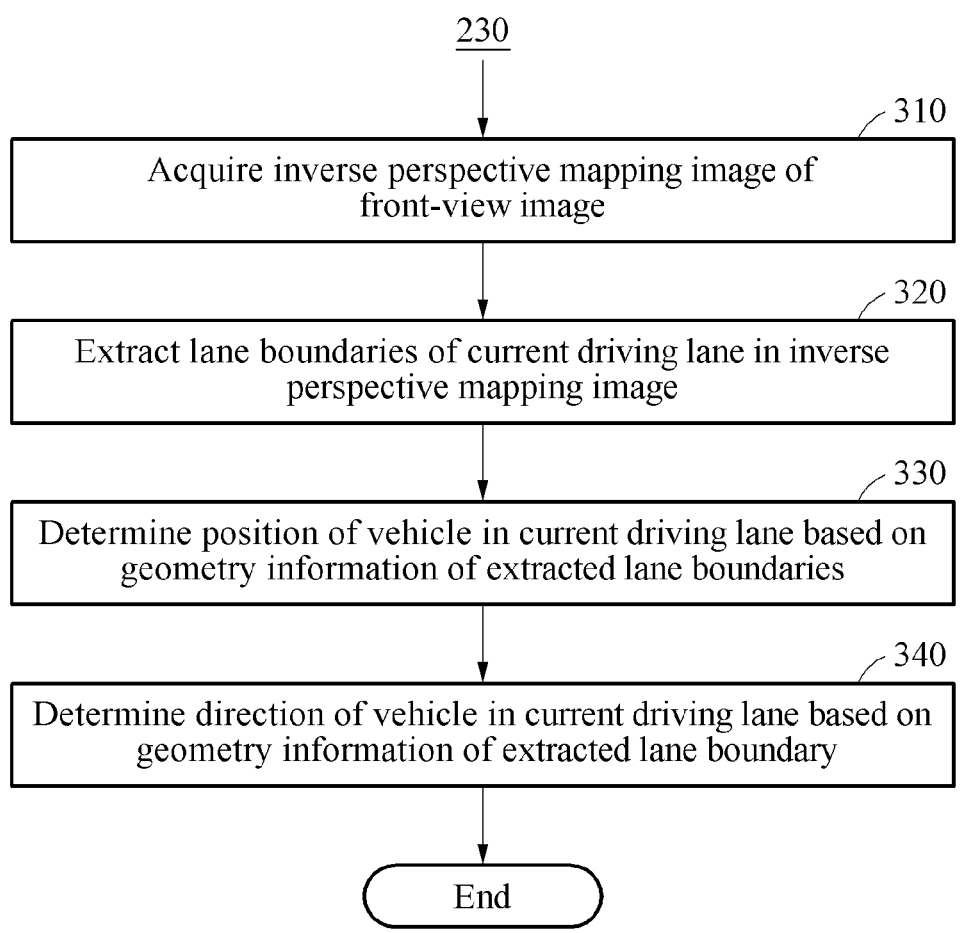

FIGS. 2 and 3 are diagrams illustrating examples of operations of a vehicle localization method. The operations in FIGS. 2 and 3 may be performed in the sequence and manner as shown, although the order of some operations may be changed or some of the operations omitted without departing from the spirit and scope of the illustrative examples described. Many of the operations shown in FIGS. 2 and 3 may be performed in parallel or concurrently. A vehicle localization method is performed by a vehicle localization apparatus described in this disclosure. The vehicle localization apparatus is an apparatus for determining a position of a vehicle and implemented on a hardware module. One or more blocks of FIGS. 2 and 3, and combinations of the blocks, can be implemented by special purpose hardware-based computer that perform the specified functions, or combinations of special purpose hardware and computer instructions. In addition to the description of FIGS. 2 and 3 below, the descriptions of FIG. 1 are also applicable to FIGS. 2 and 3, and are incorporated herein by reference. Thus, the above description may not be repeated here.

Referring to FIG. 2, in operation 210, the vehicle localization apparatus estimates a position of a vehicle based on position data sensed by a position sensor. The vehicle localization apparatus estimates a position of the vehicle based on position data measured by a sensor, such as, for example, a GPS sensor. A latitude and a longitude of the vehicle are obtained using the GPS sensor.

To more accurately estimate a position of the vehicle, the vehicle localization apparatus may use an IMU, an on-board diagnostics (OBD) sensor, and/or a visual odometry in addition to the GPS sensor. In one example, the vehicle localization apparatus measures an absolute position of the vehicle using the GPS sensor and corrects the absolute position of the vehicle using a speed and a moving direction of the vehicle measured using the IMU or the OBD sensor. The IMU includes an acceleration sensor and a gyro sensor to measure a movement and a direction of the vehicle.

In an example, to reduce an error in the absolute position measured using the GPS sensor, the vehicle localization apparatus performs a visual odometry that measures a distance between a target and the vehicle using a multi-view image of an environment around the vehicle. Through visual odometry, information on a distance between the vehicle and an object appearing in the multi-view image is estimated. Also, from a temporal change of the estimated information, an amount of movement and/or an amount of rotation of the vehicle is calculated. The absolute position of the vehicle measured using the GPS sensor is corrected based on the calculated amount of movement and/or amount of rotation.

The position data of the vehicle is sensed by the position sensor such as the GPS sensor, so that the position of the vehicle is estimated based on the sensed position data. However, the estimated position of the vehicle may not provide a sufficient positional accuracy for distinguishing a current driving lane of the vehicle. The vehicle localization apparatus may more accurately determine a position of the vehicle through the following processes.

In operation 220, the vehicle localization apparatus determines a current driving lane of the vehicle based on a front-view image captured from the vehicle. The vehicle localization apparatus analyzes the front-view image to determine a position of the driving lane currently occupied and used by the vehicle. In an example, the vehicle localization apparatus determines a lane number of the current driving lane of the vehicle from the front-view image using a driving lane identification model. The driving lane identification model is a neural network that is previously trained to output a correct lane number corresponding to an image when the image is input. The driving lane identification model receives the front-view image or features of the front-view image and outputs information on the lane number of the current driving lane of the vehicle.

In an example, the neural network may be architecture of a deep neural network (DNN) or an n-layer neural network. The DNN or n-layer neural network may correspond to a convolutional neural network (CNN), a recurrent neural network (RNN), a deep belief network, a fully connected network, a bi-directional neural network, a restricted Boltzmann machine, or may include different or overlapping neural network portions respectively with full, convolutional, recurrent, and/or bi-directional connections. For example, the neural network may be embodied as a CNN, but is not limited thereto.

The neural network may be embodied as an architecture having a plurality of layers including an input layer, feature maps, and an output. In the neural network, a convolution operation is performed on the input image with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the neural network. In an example of the neural network, in addition to the illustrated convolution layers, the CNN may further include a pooling layer or a fully connected layer.

In an example, the driving lane identification model provides information on a first lane number obtained in a direction from left toward right and a second lane number obtained in a direction from right toward left as the lane number of the current driving lane. The driving lane identification model additionally provides information on a reliability of the first lane number and a reliability of the second lane number. In an example, the vehicle localization apparatus determines the current driving lane of the vehicle based on a lane number corresponding to a higher reliability between the reliability of the first lane number and the reliability of the second lane number.

In another example, the vehicle localization apparatus determines a current driving lane using one or more surrounding images of the vehicle, in addition to the front-view image. For example, the vehicle localization apparatus determines a current driving lane of the vehicle using a rear-view image captured from the vehicle and/or a side-view image captured from the vehicle. In an example, a neural network-based driving lane identification model is used to identify the current driving lane from the image.

In operation 230, the vehicle localization apparatus corrects the position of the vehicle estimated in operation 210 based on a position of the current driving lane determined in operation 220. The vehicle localization apparatus corrects the position of the vehicle estimated using the GPS sensor to a position on a map corresponding to a lane number of the current driving lane determined in operation 220. In an example, the vehicle localization apparatus determines a center position of the current driving lane, for example, a center position between both lane boundaries defining the current driving lane to be a position of the vehicle.

In an example, the vehicle localization apparatus determines whether to correct the position of the vehicle estimated in operation 210 to be a position of the current driving lane determined in operation 220 based on a driving direction of the vehicle and a driving lane of the vehicle determined at a previous time. For example, when a lane number of a driving lane determined in the preceding time is "2", a driving direction of the vehicle is a direction parallel to a lane direction, and a lane number of a current driving lane determined currently is predicted as "4", the vehicle localization apparatus maintains the position of the vehicle as a position on a map corresponding to the lane number "2" instead of changing the position of the vehicle to a position on the map corresponding to the lane number "4" This is because it is likely that a change of driving lane has not occurred when the driving direction of the vehicle has not changed.

As such, the vehicle localization apparatus corrects the position information of the vehicle based on a position of the current driving lane, thereby improving a localization accuracy to reach a lane level. In addition, the vehicle localization apparatus more precisely calculates a vehicle position and/or a vehicle direction in a lane through a process below.

In operation 240, the vehicle localization apparatus determines a position of the vehicle in the current driving lane based on geometry information of a lane boundary appearing in the front-view image. The vehicle localization apparatus analyzes a shape of the lane boundary appearing in the front-view image to calculate an accurate position of the vehicle in the lane. Also, the vehicle localization apparatus determines a direction in which the vehicle is headed at a position determined in the current driving lane based on the lane boundary appearing in the front-view image. Operation 240 will be further described with reference to FIG. 3.

Referring to FIG. 3, in operation 310, a vehicle localization apparatus acquires an inverse perspective mapping image or a top-view image of a front-view image. In an example, to generate the inverse perspective mapping image, the vehicle localization apparatus sets a region of interest (ROI) including a road area in the front-view image and removes a perspective distortion resulting from a camera angle with respect to the ROI.

In operation 320, the vehicle localization apparatus extracts lane boundaries defining a current driving lane in the inverse perspective mapping image. In an example, the vehicle localization apparatus extracts regions in a form of line having a color of the lane boundary from the inverse perspective mapping image, and extracts regions closest in both directions from a center line of the inverse perspective mapping image as the lane boundary of the current driving lane. Also, the vehicle localization apparatus extracts lane boundaries of a driving lane from the inverse perspective mapping image using various methods, such as, for example, the vehicle localization apparatus uses a neural network-based lane boundary detection model for detecting a position of a lane boundary of the driving lane.

In operation 330, the vehicle localization apparatus determines a position of the vehicle in the current driving lane based on the geometry information of the lane boundaries extracted in operation 320. In an example, the vehicle localization apparatus determines a lower intermediate position value between lines corresponding to the lane boundaries, hereinafter, referred to as "first lower intermediate position value", extracted in operation 320. Here, the lower intermediate position value may correspond to an intermediate value between positions at which the lines meets a lower boundary of the inverse perspective mapping image. In an example, the vehicle localization apparatus calculates a difference between the lower intermediate position value of the lines and a lower intermediate position value of the inverse perspective position value, hereinafter, referred to as "second lower intermediate position value", and determines a position of the vehicle based on the difference that is calculated. For an inverse perspective mapping image, it can be known how many meters a pixel represents on a real distance. Since the calculated distance is represented by a number of pixels in the inverse perspective mapping image, a real distance value corresponding to the difference may be deducted. The vehicle localization apparatus calculates a real distance from the center position of the current driving lane to the vehicle based on the deducted real distance value.

The vehicle localization apparatus determines whether the vehicle is located at a center of the current driving lane, or is located leftwardly or rightwardly in the current driving lane based on a positional relationship between the first lower intermediate position value and the second lower intermediate position value. For example, when the first lower intermediate position value and the second lower intermediate position value is the same, it is determined that the vehicle is centered in the current driving lane. When the first lower intermediate position value is on the left of the second lower intermediate position value, it is determined that the vehicle is located rightwardly in the current driving lane. When the first lower intermediate position value is on the right of the second lower intermediate position value, it is determined that the vehicle is located leftwardly in the current driving lane.

The vehicle localization apparatus determines a position of the vehicle in the current driving lane accurately based on the positional relationship between the first lower intermediate position value and the second lower intermediate position value and a real distance value corresponding to the difference between the first lower intermediate position value and the second lower intermediate position value.

In operation 340, the vehicle localization apparatus determines a direction in which the vehicle is headed in the current driving lane based on the geometry information of the lane boundary extracted in operation 320. The vehicle localization apparatus determines the direction in which the vehicle is headed based on an angle between a line corresponding to the lane boundary extracted in operation 320 or an intermediate line between lines corresponding to lane boundaries and a reference line, for example, a center line of the inverse perspective mapping image. Since an angle of a camera capturing a front-view image is known, in an example, an accurate direction of the vehicle is predicted based on information on an angle calculated by analyzing the inverse perspective mapping image and camera angle information.

Through the foregoing process, even when there is a field of view (FoV) limitation and obstruction due to nearby vehicles and/or obstacles in the front-view image, the vehicle localization apparatus accurately estimates a position of the vehicle in the current driving lane and a direction in which the vehicle is headed at the position. Accordingly, high-precision vehicle position measurement within the current driving lane is performed at a high speed.

The operations shown in FIGS. 2 and 3 may be performed sequentially as shown, some of the operations may not be performed, or an order of the operations may be changed without departing from the scope and spirit of the examples set forth herein. For example, operations 210 and 220 of FIG. 2 and operations 330 and 340 of FIG. 3 may be performed simultaneously or in parallel.

Figure 4:
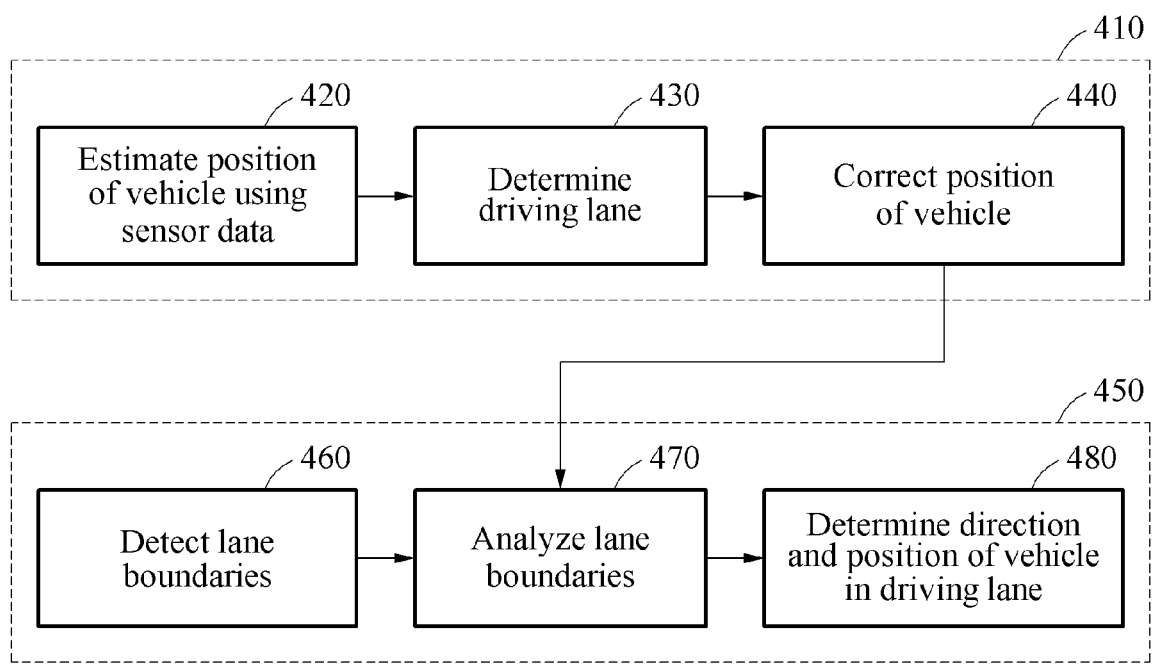
FIGS. 4 and 5 illustrate examples of a process of localizing a vehicle.
Figure 5:
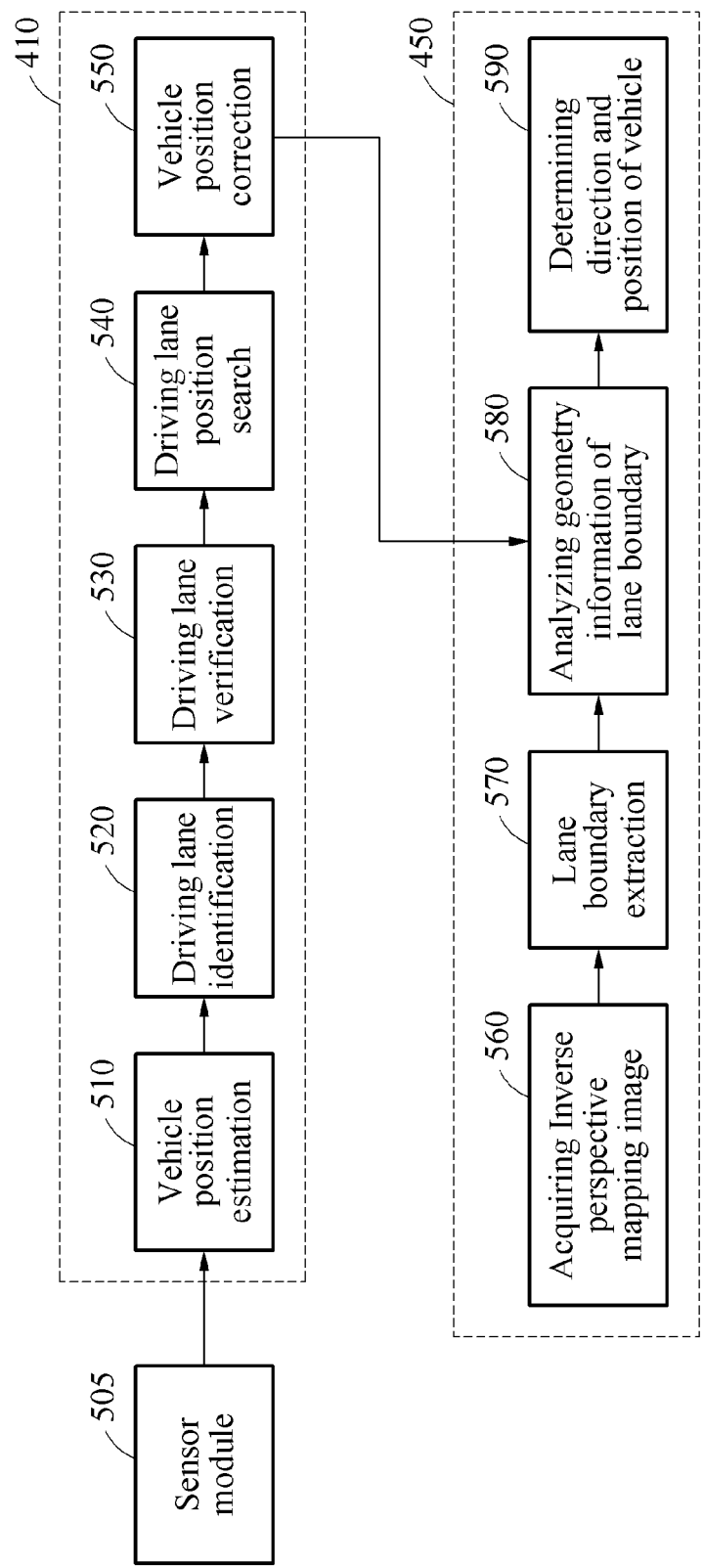

FIGS. 4 and 5 are diagrams illustrating examples of a process of localizing a vehicle. The operations in FIGS. 4 and 5 may be performed in the sequence and manner as shown, although the order of some operations may be changed or some of the operations omitted without departing from the spirit and scope of the illustrative examples described. Many of the operations shown in FIGS. 4 and 5 may be performed in parallel or concurrently. A vehicle localization method is performed by a vehicle localization apparatus described in this disclosure. The vehicle localization apparatus is an apparatus for determining a position of a vehicle and implemented on a hardware module. One or more blocks of FIGS. 4 and 5, and combinations of the blocks, can be implemented by special purpose hardware-based computer that perform the specified functions, or combinations of special purpose hardware and computer instructions. In addition to the description of FIGS. 4 and 5 below, the descriptions of FIGS. 1-3 are also applicable to FIGS. 4 and 5, and are incorporated herein by reference. Thus, the above description may not be repeated here.

Referring to FIG. 4, in an example, a vehicle localization apparatus performs a first vehicle position correction operation, for example, operation 410 using a driving lane of a vehicle and a second vehicle correction operation, for example, 450 based on geometry information of a lane boundary.

In operation 410, the vehicle localization apparatus recognizes a driving lane number and corrects a position of a vehicle at a lane level based on a result of the recognition. In an example, recognizing the driving lane number is a process of determining a lane in which the vehicle is currently driving using operations 420, 430, and 440. In operation 420, the vehicle localization apparatus estimates a position of the vehicle using sensor data acquired from a sensor, such as, for example, a GPS sensor. In an example, the vehicle localization apparatus may use an IMU, an OBD sensor, and/or a visual odometry to accurately estimate a position of the vehicle.

In operation 430, the vehicle localization apparatus determines a driving lane in which the vehicle is currently driving based on a front-view image of the vehicle. In an example, the vehicle localization apparatus detects a lane number of the driving lane from the front-view image using a driving lane identification model. When the vehicle travels right on a road, the driving lane identification model outputs a probability value of a first lane number obtained based on a center line or a left side of a road and a probability value of the driving lane for the second lane number obtained based on a right side of the road. The vehicle localization apparatus determines the lane number of the driving lane based on a greater value between the probability value of the first lane number and the probability value of the second lane number. Through this, the driving lane identification model recognizes the driving lane to be robust against occlusion caused by nearby vehicles and/or obstacles in the front-view image.

In operation 440, the vehicle localization apparatus corrects the position of the vehicle estimated in operation 420 based on a position of the driving lane determined in operation 430. In an example, the vehicle localization apparatus searches for a driving lane that is closest to a current vehicle position on a map based on a lane number of the driving lane that is determined in operation 430. The vehicle localization apparatus corrects the position of the vehicle to a position of the driving lane located in the search. For example, the position of the vehicle may be corrected to an intermediate or center position of the found driving lane. Through this, a lateral direction value of a vehicle position is corrected.

In operation 410, a position error in the driving lane may still remain and the direction and pose of the vehicle is not corrected. To reduce such error, operation 450 is performed. In operation 450, the vehicle localization apparatus corrects the direction and the position of the vehicle in the driving lane based on geometry information such as shape information of a lane boundary defining the driving lane. In an example, the vehicle localization apparatus corrects the direction and the position of the vehicle in the driving lane using operations 460, 470, and 480.

In operation 460, the vehicle localization apparatus acquires an inverse perspective mapping image based on the front-view image and detects lane boundaries of the current driving lane from the inverse perspective mapping image. The vehicle localization apparatus detects lane boundaries that are present in a certain range in the inverse perspective mapping image and detects the detected lane boundaries as lane boundaries of the current driving lane. In the case of a lane other than the driving lane, a lane boundary may not appear in the front-view image frequently. However, in the case of a lane in which the vehicle is currently driving, it is likely that the lane boundary of the driving lane appears in the front-view image due to a distance that is generally maintained from a preceding vehicle. Thus, the lane boundary of the current driving lane may be easily detected in the certain range in the inverse perspective mapping image.

In operation 470, the vehicle localization apparatus analyzes shapes of the lane boundaries detected in operation 460. The vehicle localization apparatus detects a direction (corresponding to a direction of the driving lane) and an intermediate position value of the detected lane boundaries. In an example, the vehicle localization apparatus determines a direction of the vehicle and a distance from an intermediate position (corresponding to the corrected position of the vehicle in operation 440) of the current driving lane based on detected information.

In operation 480, the vehicle localization apparatus determines a direction and a final position of the vehicle in the driving lane based on a result of lane boundary analysis in operation 470. The vehicle localization apparatus determines a direction and a position of the vehicle by applying the direction of the vehicle and the distance from the vehicle to the intermediate position of the current driving lane obtained based on a lane boundary analysis of operation 470.

FIG. 5 illustrates examples of operation 410 and operation 450 of FIG. 4 in detail.

Referring to FIG. 5, a vehicle localization apparatus receives sensor data from a sensor module 505 including a GPS sensor, an IMU, an OBD sensor and/or a camera. For example, the vehicle localization apparatus receives, from the sensor module 505, position data measured by the GPS sensor, vehicle movement and direction data measured by an inertial measurement sensor or the OBD sensor, multi-view image captured by the camera, and the like.

In operation 510, the vehicle localization apparatus estimates a position of the vehicle based on sensor data received from the sensor module 505. For example, the vehicle localization apparatus estimates a position of the vehicle by correcting an absolute position of the vehicle measured by the GPS sensor based on the vehicle movement and direction data measured by the inertial measurement sensor and/or the OBD sensor. In an example, the vehicle localization apparatus calculates a distance between the vehicle and an object around the vehicle using a visual odometry based on the multi-view image captured by the camera and corrects the absolute position of the vehicle based on the calculated distance, thereby estimating a position of the vehicle. The inertial measurement sensor, the OBD sensor, and a camera sensor may further improve an accuracy of the position data measured by the GPS sensor.

In operation 520, the vehicle localization apparatus identifies the driving lane based on a front-view image. In an example, the vehicle localization apparatus identifies the driving lane from the front-view image using a driving lane identification model. The driving lane identification model outputs a lane number obtained based on a left boundary, for example, a center line of a road and a lane number obtained based on a right boundary, for example, a right-edge boundary line, of the road. The vehicle localization apparatus determines a lane number of a lane in which the vehicle is currently driving based on a lane number having a greater reliability between the two output lane numbers.

In operation 530, the vehicle localization apparatus verifies whether the driving lane identified in operation 520 is appropriate. For example, when a lane number of the driving lane determined previously (or determined in a previous frame of the front view) is "3" and the number is changed to a lane number "2" of the driving lane that is determined currently (or determined in a current frame of the front-view image), the vehicle localization apparatus determines whether the currently determined lane number is correct based on factors such as, for example, a driving direction of the vehicle, and a number of lanes of the road. In an example, when the number of lanes of the road is not changed and the vehicle is driving straight ahead, the previously determined lane number may be the same as the currently determined lane number. In an example, when the number of lanes of the road is not changed and the vehicle is driving straight ahead, the vehicle localization apparatus maintains the previously determined lane number even thought the lane number of the current driving lane is determined to be different from the previously determined lane number. In this example, a lane number of the driving lane at present is determined to be "3" instead of "2". In an example, when the number of lanes of the road is changed and/or the driving direction of the vehicle is not a straightforward direction, the currently determined lane number is determined to be the lane number of the driving lane.

In operation 540, the vehicle localization apparatus searches for a driving lane position corresponding to the lane number of the driving lane on the map. The vehicle localization apparatus identifies a position of the vehicle on the map based on the position of the vehicle estimated in operation 510 and searches for a position corresponding to the lane number of the driving lane based on the identified position of the vehicle.

In operation 550, the vehicle localization apparatus corrects the position of the vehicle to the driving lane position found on the map. The vehicle localization apparatus corrects the position of the vehicle from the position of the vehicle estimated in operation 510 to a position of the vehicle on the map corresponding to the lane number of the current driving lane (for example, an intermediate or center position of a lane corresponding to the lane number).

In operation 560, the vehicle localization apparatus acquires an inverse perspective mapping image from the front-view image using an inverse perspective mapping method. In operation 570, the vehicle localization apparatus extracts a lane boundary of the current driving lane from the inverse perspective mapping image. The vehicle localization apparatus extracts a lane boundary of the current driving lane, from the inverse perspective mapping image using, for example, a pixel value analysis or a neural network-based lane boundary detection model.

In operation 580, the vehicle localization apparatus analyzes geometry information of the lane boundary extracted in operation 570. In an example, the vehicle localization apparatus calculates a lower intermediate position value of lines corresponding to the extracted lane boundaries and a direction of the lines.

In operation 590 the vehicle localization apparatus determines a direction in which the vehicle is headed (or a pose of the vehicle) and a position of the vehicle in the current driving lane based on a result of analysis in operation 580. In an example, the vehicle localization apparatus determines whether or not the vehicle is positioned at the intermediate position of the current driving lane to the vehicle based on a difference between a lower intermediate position value of the lines corresponding to the lane boundaries of the driving lane in the inverse perspective mapping image and a lower intermediate position value of the inverse perspective mapping image. Also, the vehicle localization apparatus calculates a direction of the vehicle based on a difference in angle between a line corresponding to the lane boundary of the driving lane extracted from the inverse perspective mapping image and an intermediate line of the inverse perspective mapping image. The vehicle localization apparatus determines a final position of the vehicle in the current driving lane and a direction of the vehicle at the final position by applying a result of the calculating to the position of the vehicle corrected in operation 550.

Figure 6:
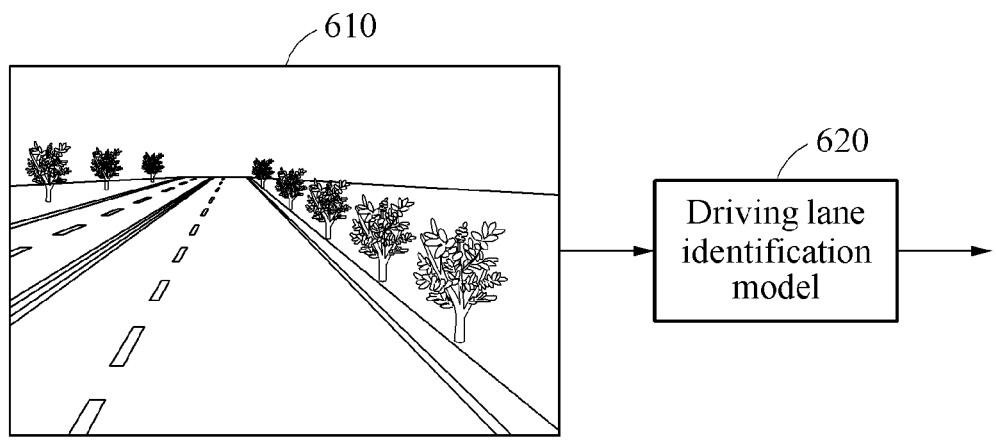
FIG. 6 illustrates an example of a process of identifying a driving lane of a vehicle.

FIG. 6 is a diagram illustrating an example of a process of identifying a driving lane of a vehicle.

FIG. 6 illustrates an example of a front-view image 610 captured by a camera located in a vehicle. In an example, the front-view image 610 is input to a neural network-based driving lane identification model 620. In an example, an image preprocessing process may be performed on the front-view image 610 before the front-view image 610 is input to the driving lane identification model 620. The image preprocessing process includes one or more of removing noise in the front-view image 610, increasing a contrast of the front-view image 610, deblurring to remove a blur in the front-view image 610, removing an unnecessary area in the front-view image 610, warping to correct distortion in the front-view image 610, and binarizing the front-view image 610.

The driving lane identification model 620 provides information for identifying the current driving lane in the front-view image 610. In an example, the driving lane identification model 620 provides information on a lane number of the current driving lane and a reliability corresponding to the lane number. For example, as the lane number of the current driving lane, the driving lane identification model 620 provides a probability value of a first lane number obtained in a direction from left to right and a probability value of a second lane number obtained in a direction from right to left. The vehicle localization apparatus determines a lane number corresponding to a greater probability value to be the lane number of the current driving lane.

Figure 7:
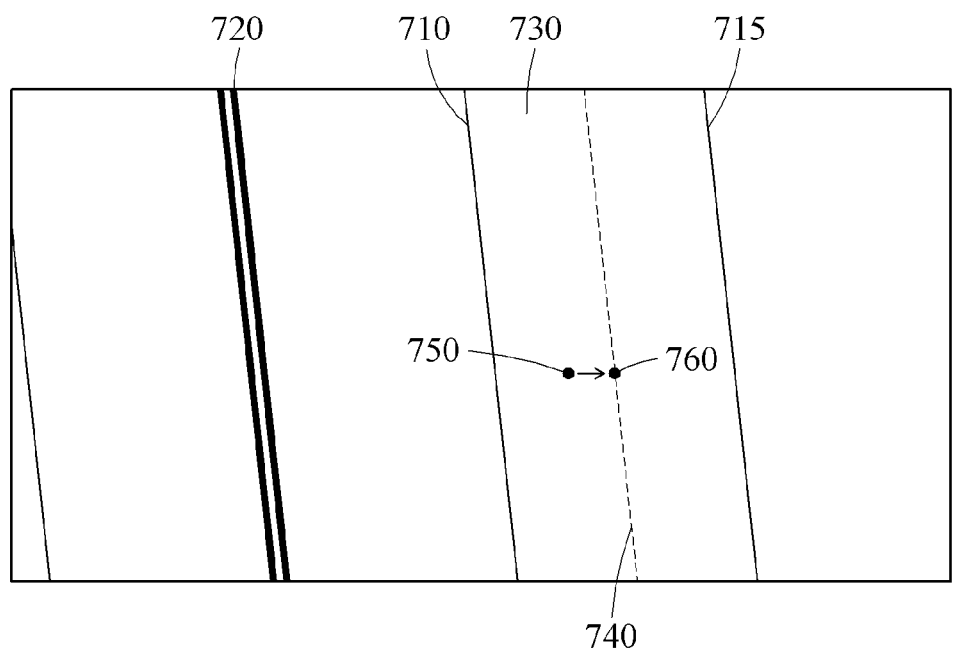
FIG. 7 illustrates an example of a process of correcting a position of a vehicle based on a result of an identifying a driving lane.

FIG. 7 is a diagram illustrating an example of a process of correcting a position of a vehicle based on an identification result of a driving lane.

Referring to FIG. 7, a position 750 is a position of a vehicle estimated based on position data output from a position sensor such as a GPS sensor. Based on an analysis of a front-view image, a lane 730 is identified as a current driving lane of the vehicle. A reference numeral 720 corresponds to a center line on a road.

A vehicle localization apparatus extracts both lane both lane boundaries 710 and 715 to define a driving lane 730 on a map and corrects a position 750 of the vehicle obtained based on sensor data to a position 760 based on an intermediate line 740 between both of the lane boundaries 710 and 715. Thus, the position 750 of the vehicle is corrected laterally and an intermediate position 760 of both of the lane boundaries 710 and 715 defining the driving lane 730 is determined to be a position of the vehicle. Through this, an error range of a vehicle position is reduced to a range of less than half of a lane width, for example, a level of 0 to 1.5 m.

Figure 8:
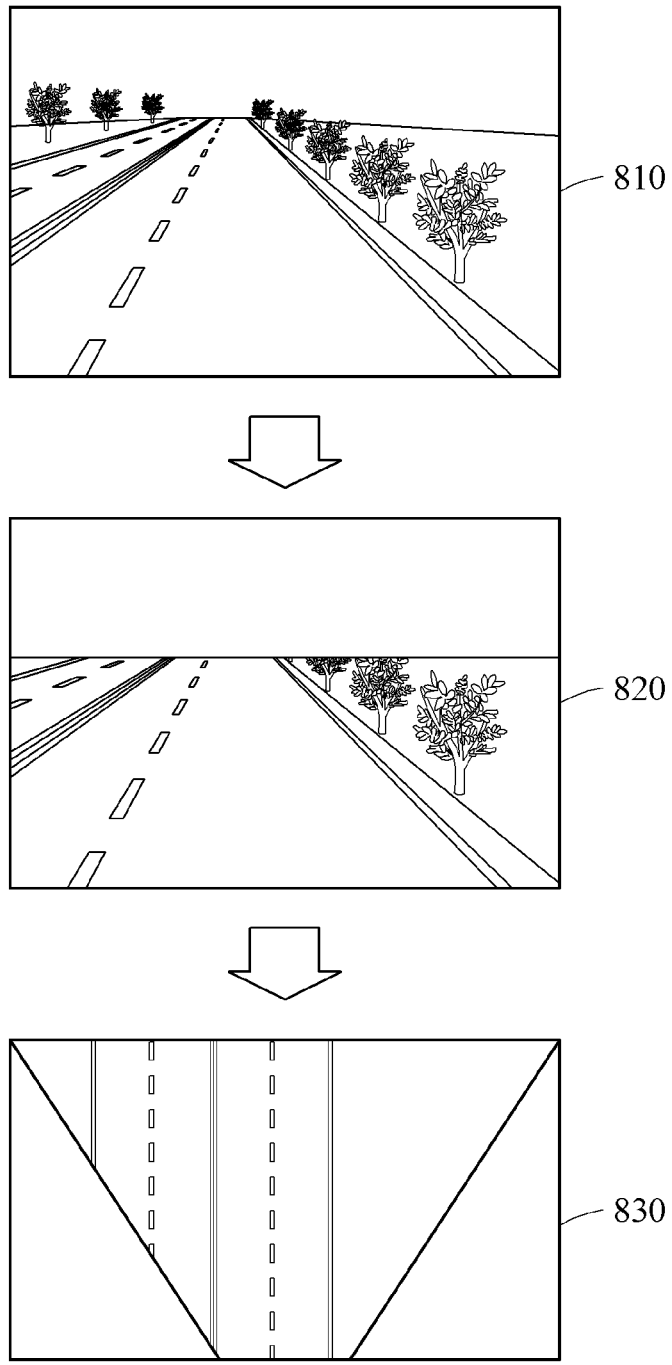
FIG. 8 illustrates an example of a process of acquiring an inverse perspective mapping image from a front-view image.

FIG. 8 is a diagram illustrating an example of a process of acquiring an inverse perspective mapping image from a front-view image.

FIG. 8 illustrates a front-view image 810 acquired by capturing a front-view by a camera from a vehicle. In an example, to remove an area of the front view image 810 that is not needed, an ROI 820 including a road area is extracted. A vehicle localization apparatus acquires an inverse perspective mapping image 830 by applying an inverse perspective mapping scheme to the ROI 820 based on calibration parameters of the camera used to acquire the front-view image 810. In an example, the inverse perspective mapping scheme is a scheme for generating a top-view image by removing perspective distortion that are caused by a camera angle. In the case of the inverse perspective mapping image 830, a pixel to meter metric is available. For example, it is possible to calculate how many meters a pixel represents in the inverse perspective mapping image 830.

Figure 9:
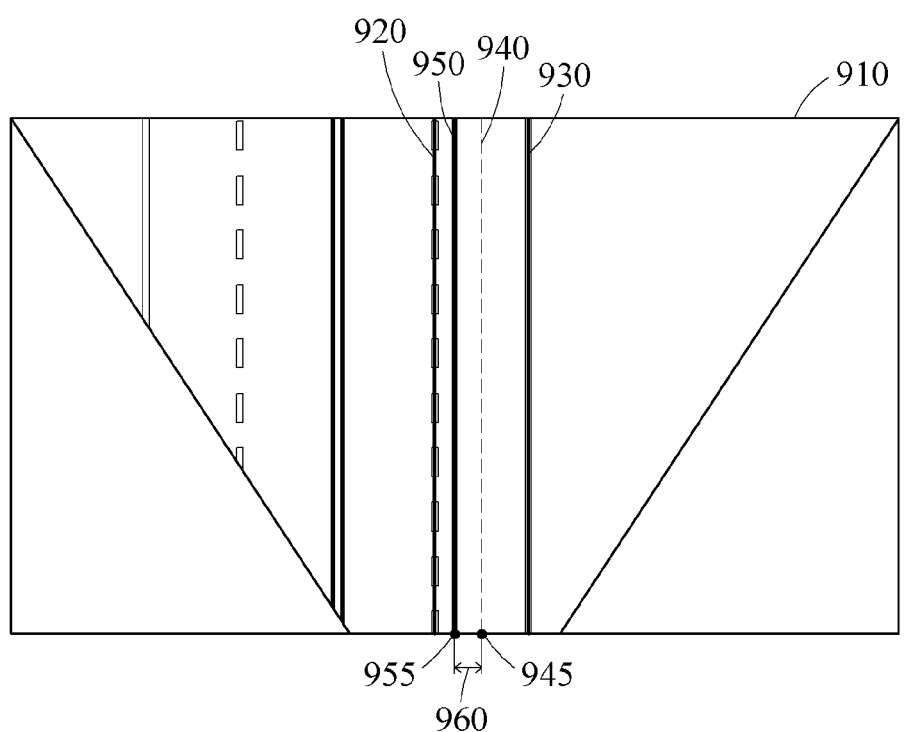
FIGS. 9 and 10 illustrate examples of a process of correcting a position of a vehicle based on geometry information of a lane boundary.
Figure 10:
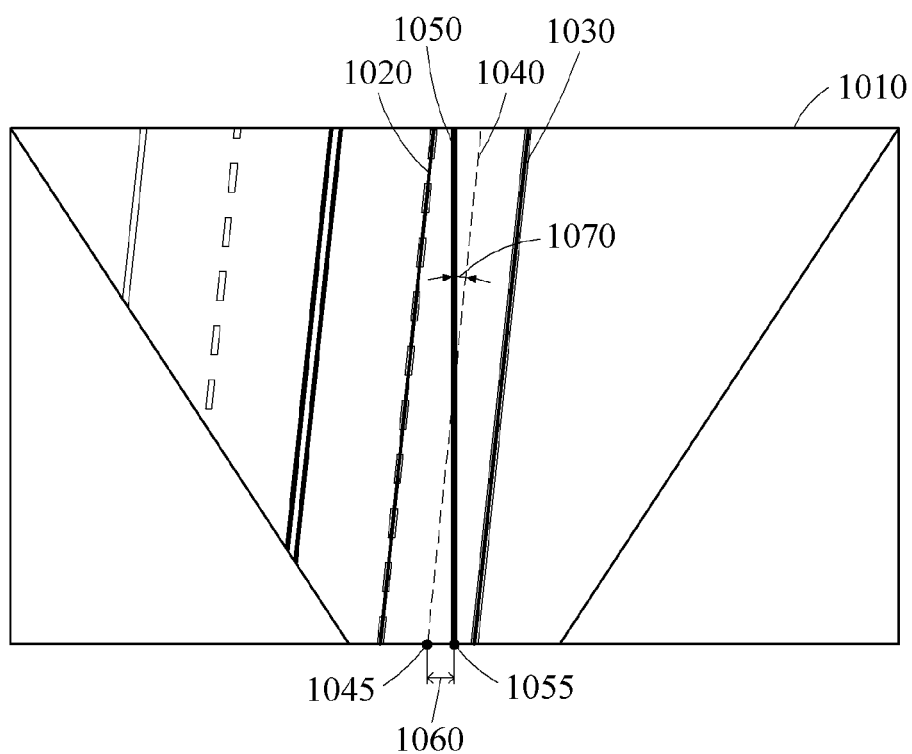

FIGS. 9 and 10 are diagrams illustrating examples of a process of correcting a position of a vehicle based on geometry information of a lane boundary.

Referring to FIG. 9, a vehicle localization apparatus detects both lane boundaries defining a current driving lane in an inverse perspective mapping image 910. In an example, the vehicle localization apparatus more accurately determine a position of a vehicle in a driving lane based on geometry information such as shape information of the detected lane boundaries.

The vehicle localization apparatus sets lines 920 and 930 corresponding to the lane boundaries of the current driving lane in the inverse perspective mapping image 910. The vehicle localization apparatus calculates a lower intermediate position value 945 corresponding to a position at which an intermediate line 940 of the lines 920 and 930 meets a lower boundary of the inverse perspective mapping image 910. Also, the vehicle localization apparatus calculates a lower intermediate position value 955 corresponding to a position at which an intermediate line 950 of the inverse perspective mapping image 910 meets the lower boundary of the inverse perspective mapping image 910. A difference 960 between the lower intermediate position value 945 and the lower intermediate position value 955 corresponds to a vehicle position error and the vehicle localization apparatus corrects the position of the vehicle based on the difference 960. Since a pixel to meter metric is available for the inverse perspective mapping image 910, how many meters a pixel represents in the inverse perspective mapping image 830 is calculated. The vehicle localization apparatus determines a final position of the vehicle by applying a distance of a number of pixels corresponding to the difference 960 to an original position of the vehicle.

Referring to FIG. 10, a vehicle localization apparatus detects both lane boundaries defining a current driving lane from an inverse perspective mapping image 1010 and determines a direction and a position of the vehicle in a driving lane based on geometry information of the detected lane boundaries.

The vehicle localization apparatus sets lines 1020 and 1030 corresponding to the lane boundaries of the current driving lane in the inverse perspective mapping image 1010. The vehicle localization apparatus calculates a lower intermediate position value 1045 corresponding to a position at which an intermediate line 1040 between the lines 1020 and 1030 meets a lower boundary of the inverse perspective mapping image 1010. Also, the vehicle localization apparatus calculates a lower intermediate position value 1055 corresponding to a position at which an intermediate line 1050 of the inverse perspective mapping image 1010 meets the lower boundary of the inverse perspective mapping image 1010. A difference between the lower intermediate position value 1045 and the lower intermediate position value 1055 corresponds to a vehicle position error. The vehicle localization apparatus corrects the position of the vehicle based on a distance corresponding to the difference 1060.

Also, the vehicle localization apparatus estimates a direction of the vehicle based on an angle 1070 or a directional difference between the intermediate line 1040 between the lines 1020 and 1030 and the intermediate line 1050 of the inverse perspective mapping image 1010. For example, the vehicle localization apparatus estimates that a direction in which the vehicle is headed in the current driving lane may be a direction that is angled by the angle 1070 relative to a direction of the intermediate line 1040. Through this, the vehicle localization apparatus precisely predicts a position of the vehicle in the current driving lane and a direction of the vehicle at the position.

Figure 11:
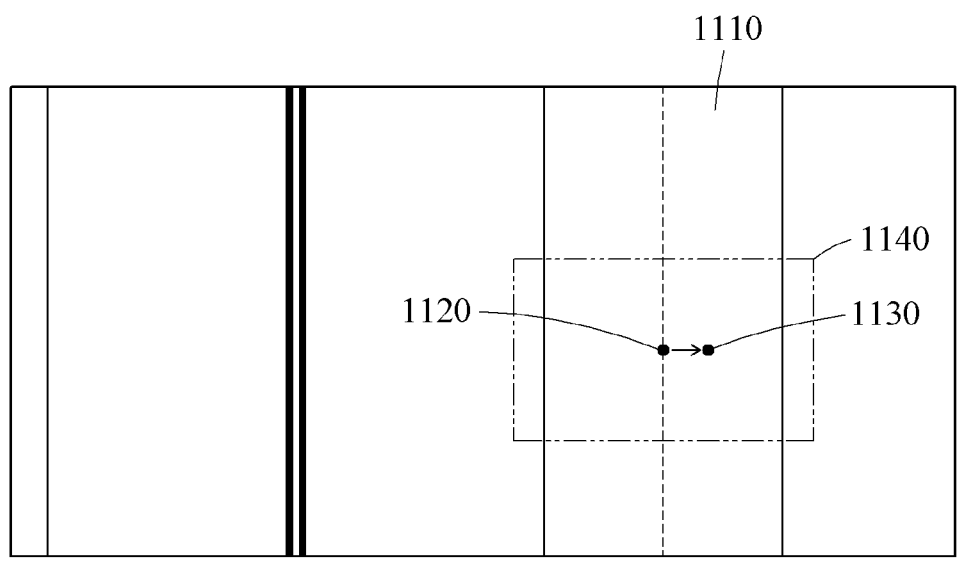
FIGS. 11 and 12 illustrate examples of a process of determining a position and a direction of a vehicle in a driving lane.
Figure 12:
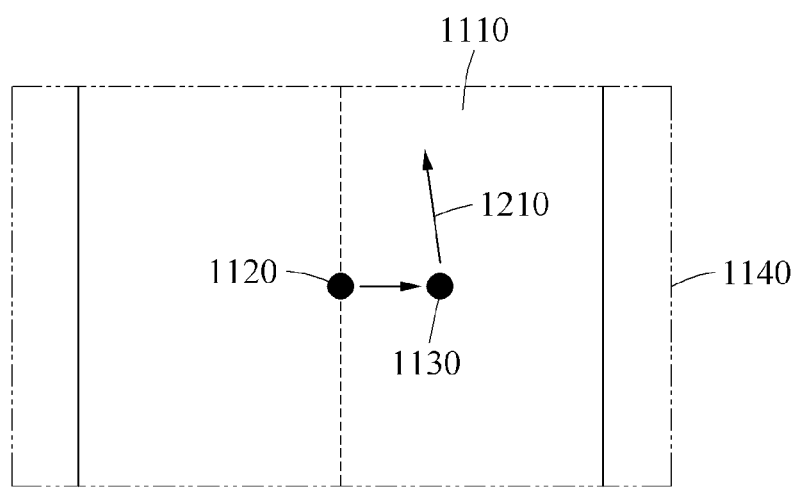

FIGS. 11 and 12 are diagrams illustrating examples of a process of determining a position and a direction of a vehicle in a driving lane.

Referring to FIG. 11, a position estimated based on sensor data is corrected to an intermediate position 1120 of a current driving lane 1110 as a result of a primary correction to a vehicle position. As described with reference to FIGS. 9 and 10, a vehicle position error in a current driving lane is calculated based on geometry information of a lane boundary. By compensating for such error, a vehicle localization apparatus may more accurately correct the position of the vehicle in the current driving lane. For example, the vehicle localization apparatus performs secondary correction on the position of the vehicle by applying a distance corresponding to the difference 960 between the lower intermediate position value 945 and the lower intermediate position value 955 of FIG. 9 to the intermediate position 1120. Through the secondary correction, the vehicle position error in the current driving lane is removed. When the intermediate position 1120 is changed to a position 1130, the position 1130 is determined to be a final position of the vehicle as a result of the vehicle position correction.

FIG. 12 is an enlarged view illustrating an area 1140 of FIG. 11. Referring to FIG. 12, a vehicle localization apparatus determines the final position 1130 of a vehicle in the current driving lane 1110 and a direction 1210 in which a vehicle is headed at the position 1130. For example, the vehicle localization apparatus determines a direction in which the vehicle is headed by applying the angle 1070 between the intermediate line 1040 and the intermediate line 1050 to a direction of the intermediate line 1040.

Figure 13:
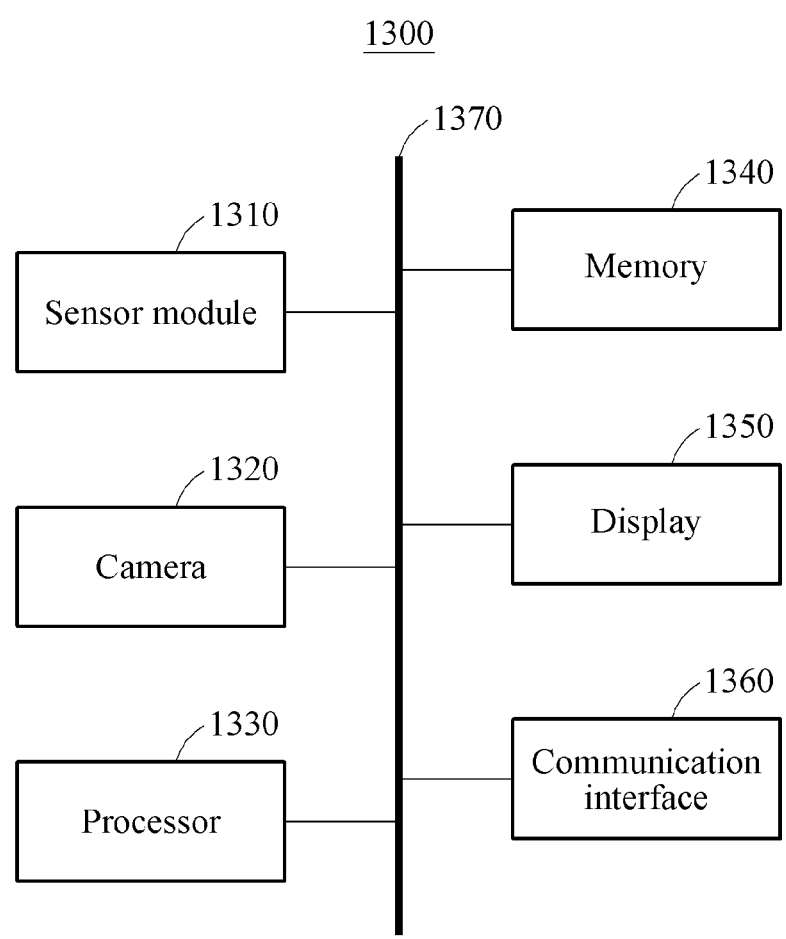
FIG. 13 illustrates an example of a vehicle localization apparatus.

FIG. 13 is a diagram illustrating an example of a vehicle localization apparatus.

Referring to FIG. 13, a vehicle localization apparatus 1300 includes a processor 1330, a memory 1340, and a communication bus 1370. Depending on an example, the vehicle localization apparatus 1300 further includes a sensor module 1310, a camera 1320, a display 1350, and/or a communication interface 1360. The sensor module 1310, the camera 1320, the processor 1330, the memory 1340, the display 1350, and the communication interface 1360 communicate with one another through the communication bus 1370.

In an example, the sensor module 1310 includes at least one sensor. The sensor module 1310 includes a position sensor such as a GPS sensor for sensing position data of a vehicle, an IMU, and/or an OBD sensor. The sensor module 1310 senses a position of a vehicle, a pose of the vehicle, and a driving environment of the vehicle and provides sensing data as a result of the sensing. The sensor module 1310 may further include, for example, a radar, a lidar, an ultrasonic sensor, and an infrared camera.

The camera 1320 captures an ambient view from the vehicle to provide an ambient-view image of the vehicle. For example, the camera 1320 captures a front view from the vehicle and provides a front-view image. Also, the camera 1320 provides a multi-view image used for measuring a distance between the vehicle and an object around the vehicle.

The memory 1340 is connected to the processor 1330 and stores instructions executable by the processor 1330, data to be calculated by the processor 1330, or data processed by the processor 1330. The memory 1340 stores, for example, sensor data received from the sensor module 1310, calculated vehicle position data, and map data. The memory 1340 includes a non-transitory computer-readable medium, for example, a high-speed random access memory (RAM) and/or a non-volatile computer-readable storage medium (for example, one or more disk storage devices, a flash memory device, or other nonvolatile solid state memory devices). Further details on the memory 1340 are provided below.

The processor 1330 controls an overall operation of the vehicle localization apparatus 1300 and executes function and instructions to be performed in the vehicle localization apparatus 1300. The processor 1330 performs one or more operations described with reference to FIGS. 1 through 12. In an example, the processor 1330 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a multiprocessor, an application-specific integrated circuit (ASIC), and a field programmable gate array (FPGA). Further details on the processor 1330 are provided below.

For example, the processor 1330 estimates a position of the vehicle based on the position data of the vehicle received from the sensor module 1310. In an example, the processor 1330 estimates a position of the vehicle based on vehicle position data measured using a GPS sensor and vehicle movement information estimated using at least one of an IMU, an OBD sensor, and a VO. The processor 1330 determines a current driving lane and a lane number of the driving lane using a driving lane identification model that uses a front-view image of the vehicle as an input. The processor 1330 corrects the vehicle position data estimated based on position data of a sensor based on the determined lane number of the current driving lane and map information. For example, the processor 1330 identifies a lane corresponding to the determined lane number on a map and corrects the vehicle position data by determining a position on the map corresponding to an intermediate position of the identified lane to be a position of the vehicle.

Also, the processor 1330 performs a secondary correction or re-corrects the position of the vehicle based on geometry information of a lane boundary appearing in the front-view image. The processor 1330 determines a direction and/or a position of the vehicle in a current driving lane based on geometry information of a lane boundary defining the current driving lane. The processor 1330 converts the front-view image into an inverse perspective mapping image and extracts lane boundaries defining the current driving lane in the inverse perspective mapping image. The processor 1330 re-corrects the position of the vehicle by determining a position of the vehicle in the current driving lane based on geometry information of the extracted lane boundaries. The processor 1330 determines a position of the vehicle based on a difference between a lower intermediate position value between lines corresponding to the extracted lane boundaries and a lower intermediate position value of the inverse perspective mapping image. The processor 1330 calculates a distance and a direction from the center of the current driving lane to the vehicle based on the difference. Also, the processor 1330 estimates a direction and a pose of the vehicle based on a direction of a line corresponding to a lane boundary of a driving lane extracted from the inverse perspective mapping image. Through this, the processor 1330 determines a current position of the vehicle with increased accuracy.

The display 1350 displays the position of the vehicle determined by the processor 1330 and a path guide generated based on the position of the vehicle. In an example, the display 1350 is a physical structure that includes one or more hardware components that provide the ability to render a user interface and/or receive user input. In an example, the corrected position of the vehicle is displayed on a wind shield glass or a separate screen of the vehicle using a head-up display (HUD) device. or is displayed on an augmented reality head-up display (AR HUD). In an example, the vehicle localization apparatus 1300 transmits the localization information to an electronic control unit (ECU) or a vehicle control unit (VCU) of a vehicle. The ECU or the VCU displays the localization information on display device 1350 of the vehicle.

However, the displaying of the corrected position of the vehicle is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the localization apparatus 1400 may be used without departing from the spirit and scope of the illustrative examples described.

The communication interface 1360 provides a function to communicate with an external device of the vehicle localization apparatus 1300. For example, the communication interface 1360 receives map information and/or navigation information corresponding to a road on which the vehicle is driving from the external device.

The vehicle localization apparatus, vehicle localization apparatus 1300, apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle localization method comprising:
    estimating an initial position of a vehicle based on data sensed by a position sensor;
    determining a driving lane of the vehicle based on a front-view image captured from the vehicle;
    acquiring an inverse perspective mapping image of the front-view image;
    extracting lane boundaries of the vehicle based on the driving lane in the inverse perspective mapping image; and
    determining a position of the vehicle in the driving lane based on geometry information of the extracted lane boundaries and the initial position of the vehicle.

2. The vehicle localization method of claim 1, wherein the acquiring of the inverse perspective mapping image comprises:
    selecting a region of interest (ROI) comprising a road area in the front-view image; and
    removing a perspective distortion from the ROI resulting from a camera angle to the ROI.

3. The vehicle localization method of claim 1, wherein the extracting of the lane boundaries of the driving lane comprises extracting regions having a shape of a line and a color of the lane boundary that are located closest to a center line of the inverse perspective mapping image.

4. The vehicle localization method of claim 1, wherein the determining of the position of the vehicle comprises:
determining a position of the vehicle based on a difference between a first lower intermediate position value between lines of the extracted lane boundaries and a second lower intermediate position value of the inverse perspective mapping image.

5. The vehicle localization method of claim 1, further comprising:
determining a direction in which the vehicle is headed at the determined position based on the geometry information of the lane boundary in the front-view image.

6. The vehicle localization method of claim 5, wherein the determining of the direction in which the vehicle is headed comprises:
determining the direction in which the vehicle is headed based on geometry information of the extracted lane boundary from the inverse perspective mapping image.

7. The vehicle localization method of claim 6, wherein the determining of the direction in which the vehicle is headed comprises:
determining the direction in which the vehicle is headed based on a direction of a line corresponding to the extracted lane boundary.

8. The vehicle localization method of claim 1, further comprising:
correcting of the initial position of the vehicle based on determining a position on a map corresponding to an intermediate position of the driving lane to be the position of the vehicle, and
the determining of the position of the vehicle in the driving lane comprises determining the position of the vehicle in the driving lane based on geometry information of the extracted lane boundaries and the corrected initial position of the vehicle.

9. The vehicle localization method of claim 1, wherein the determining of the driving lane of the vehicle comprises:
determining a lane number of the driving lane of the vehicle from the front-view image using a neural network-based driving lane identification model.

10. The vehicle localization method of claim 9, wherein the determining of the driving lane of the vehicle comprises:
determining a first lane number in a direction from left toward right and a second lane number in a direction from right toward left using the neural network-based driving lane identification model; and
determining the driving lane of the vehicle based on a lane number of one of the first lane number or the second lane number having a higher reliability.

11. The vehicle localization method of claim 9, further comprising:
correcting the initial position of the vehicle to a position on a map corresponding to the determined lane number; and
the determining of the position of the vehicle in the driving lane comprises determining the position of the vehicle in the driving lane based on geometry information of the extracted lane boundaries and the corrected initial position of the vehicle.

12. The vehicle localization method of claim 1, wherein the determining of the driving lane of the vehicle comprises:
determining a lane number of the driving lane of the vehicle from the front-view image and a surrounding image of the vehicle using a neural network-based driving lane identification model.

13. The vehicle localization method of claim 1, further comprising:
correcting of the initial position of the vehicle based on determining whether the initial position of the vehicle is corrected to a position of the driving lane based on a driving direction of the vehicle and a driving lane of the vehicle determined at a previous time, and
the determining of the position of the vehicle in the driving lane comprises determining the position of the vehicle in the driving lane based on geometry information of the extracted lane boundaries and the corrected initial position of the vehicle.

14. A non-transitory computer-readable storage medium storing instructions that, when executed by a processor, cause the processor to perform the vehicle localization method of claim 1.

15. A vehicle localization apparatus comprising:
a position sensor configured to sense position data of a vehicle; and
a processor configured to:
estimate an initial position of the vehicle based on the position data,
determine a driving lane of the vehicle based on the front-view image captured from the vehicle,
acquire an inverse perspective mapping image of the front-view image;
extract lane boundaries of the vehicle based on the driving lane in the inverse perspective mapping image, and
determine a position of the vehicle in the driving lane based on geometry information of the extracted lane boundaries and the initial position of the vehicle.

16. The vehicle localization apparatus of claim 15, wherein the processor is further configured to correct the initial position of the vehicle by determining a position on a map corresponding to an intermediate position of the current driving lane to be the position of the vehicle.

17. The vehicle localization apparatus of claim 15, wherein the processor is further configured to
determine a position of the vehicle based on a difference between a first lower intermediate position value between lines of the extracted lane boundaries and a second lower intermediate position value of the inverse perspective mapping image.

18. The vehicle localization apparatus of claim 15, wherein the processor is further configured to determine a direction in which the vehicle is headed based on the geometric information of the lane boundary.

19. The vehicle localization apparatus of claim 15, wherein the processor is further configured to:
adjust the initial position of the vehicle in a lateral direction based on the driving lane,
determine a direction of the vehicle and a distance of the adjusted position of the vehicle from an intermediate position of the boundaries of the driving lane, and
correct the adjusted position based on the distance and the direction.

20. The vehicle localization apparatus of claim 19, wherein, the processor is further configured to estimate the initial position based on correcting the position of the vehicle using a distance between the vehicle and an object around the vehicle.

21. The vehicle localization apparatus of claim 19, wherein, the processor is further configured to determine the driving lane of the vehicle based on identifying, on a map, a lane that is closest to the initial position of the vehicle.

22. A vehicle localization apparatus comprising:
a position sensor configured to sense position data of a vehicle; and
a processor configured to,
determine a lane number of a driving lane in which the vehicle is driving based on a front-view image captured from the vehicle,
convert the front-view image into an inverse perspective mapping image,
extract lane boundaries of the driving lane from the inverse perspective mapping image,
correct the position data of the vehicle based on geometry information of the extracted lane boundaries and the lane number, and
determine a position of the vehicle based on the corrected position data.

23. The vehicle localization apparatus of claim 22, wherein the processor is further configured to correct the position data of the vehicle by identifying a lane corresponding to the lane number on a map and determining a position on the map corresponding to an intermediate position of the driving lane to be a position of the vehicle.

24. The vehicle localization apparatus of claim 22, wherein the processor is further configured to:
adjust the position of the vehicle by determining a position of the vehicle in the driving lane based on geometry information of the extracted lane boundaries.

* * * * *